United States Patent
Whaites et al.

(10) Patent No.: US 9,702,630 B2
(45) Date of Patent: Jul. 11, 2017

(54) HEAT EXCHANGER

(71) Applicant: BAE Systems plc, London (GB)

(72) Inventors: Colin Whaites, Preston (GB); Stephen John Richard Smith, Preston (GB); Andrew Mark Townsley, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/125,710

(22) PCT Filed: Mar. 11, 2015

(86) PCT No.: PCT/GB2015/050705
§ 371 (c)(1),
(2) Date: Sep. 13, 2016

(87) PCT Pub. No.: WO2015/136276
PCT Pub. Date: Sep. 17, 2015

(65) Prior Publication Data
US 2017/0003080 A1    Jan. 5, 2017

(30) Foreign Application Priority Data

Mar. 13, 2014  (EP) ..................................... 14275057
Mar. 13, 2014  (GB) ................................... 1404445.7

(51) Int. Cl.
B64D 13/00    (2006.01)
B64D 33/02    (2006.01)
(Continued)

(52) U.S. Cl.
CPC ............ F28D 7/0008 (2013.01); B64D 13/00 (2013.01); B64D 33/02 (2013.01); F01D 9/02 (2013.01);
(Continued)

(58) Field of Classification Search
CPC ... F01D 9/02; F01D 9/04; F01D 25/12; F02C 7/14; F02C 7/16; F02C 7/18; F02C 7/185;
(Continued)

(56) References Cited

U.S. PATENT DOCUMENTS 2,474,258 A    6/1949  Kroon
3,475,906 A *  11/1969 Madelung .............. B64D 13/00
                                                          417/313
(Continued)

FOREIGN PATENT DOCUMENTS

EP    1156187 A2    11/2001
EP    1630358 A2     3/2006
(Continued)

OTHER PUBLICATIONS

Great Britain Combined Search and Examination Report under Sections 17 and 18(3) of Application No. GB1504077.7, dated Apr. 27, 2015, 5 pages.
(Continued)

Primary Examiner — Gregory Anderson
Assistant Examiner — Christopher R Legendre
(74) Attorney, Agent, or Firm — Maine Cernota & Rardin

(57) ABSTRACT

A heat exchanger (2) comprising a duct (4) through which a first fluid (e.g. a coolant such as ram air) may flow, and one or more vanes (18) disposed within the duct (4) and configured to disrupt the flow of the first fluid through the duct (4). Each vane (18) comprises one or more flow channels (24) through which a second fluid (e.g. a fluid to be cooled, such as engine coolant) may flow so as to transfer heat between the first fluid flowing through the duct (4) and the second fluid flowing through the one or more flow channels (24). The flow channels (24) within the vanes (18) are separated from the duct (4) by a channel wall such that fluid cannot flow between the duct (4) and the flow channels (24).

15 Claims, 3 Drawing Sheets

(51) Int. Cl.
*F01D 9/02* (2006.01)
*F01D 9/04* (2006.01)
*F01D 25/12* (2006.01)
*F02C 7/14* (2006.01)
*F02C 7/18* (2006.01)
*F28D 7/00* (2006.01)
*F28D 21/00* (2006.01)

(52) U.S. Cl.
CPC .............. *F01D 9/04* (2013.01); *F01D 25/12* (2013.01); *F02C 7/14* (2013.01); *F02C 7/185* (2013.01); *F28D 7/0058* (2013.01); *B64D 2033/024* (2013.01); *F05D 2260/213* (2013.01); *F05D 2300/5024* (2013.01); *F28D 2021/0021* (2013.01); *Y02T 50/676* (2013.01)

(58) Field of Classification Search
CPC ....... F05D 2260/213; F05D 2300/5024; F28D 7/0008; F28D 7/0025; F28D 7/0058; F28D 7/16; F28D 7/1607; F28D 7/1615; F28D 2021/0021; B64D 13/00; B64D 13/006; B64D 2033/024
See application file for complete search history.

(56) References Cited

U.S. PATENT DOCUMENTS

| | | | |
|---|---|---|---|
| 5,002,460 A | 3/1991 | Lee et al. | |
| 6,302,197 B1 | 10/2001 | Hornby et al. | |
| 6,315,518 B1 * | 11/2001 | Uematsu | F01D 5/186 415/115 |
| 7,377,098 B2 * | 5/2008 | Walker | F01D 9/065 184/6.11 |
| 9,249,730 B2 * | 2/2016 | Bourassa | F02C 7/185 |
| 2002/0018711 A1 | 2/2002 | Ferber | |
| 2004/0035562 A1 | 2/2004 | Nishijima et al. | |
| 2012/0199334 A1 | 8/2012 | Maurer et al. | |
| 2012/0243970 A1 * | 9/2012 | Hellgren | F01D 5/187 415/1 |
| 2015/0023776 A1 * | 1/2015 | Ribarov | F01D 9/065 415/1 |
| 2017/0003080 A1 * | 1/2017 | Whaites | B64D 13/00 |

FOREIGN PATENT DOCUMENTS

| | | | | |
|---|---|---|---|---|
| FR | 1148637 A | * | 12/1957 | ............... F02C 7/04 |
| FR | 3028576 A1 | * | 5/2016 | ............ F01D 9/041 |
| GB | 2144806 A | | 3/1985 | |
| JP | 10280908 A | * | 10/1998 | |
| JP | 2002139282 A | | 5/2002 | |
| WO | 2011088426 A1 | | 7/2011 | |

OTHER PUBLICATIONS

International Search Report and Written Opinion of Application No. PCT/GB2015/050705 fd Mar. 11, 2015, dated May 11, 2015, 10 pages.

Search Report under Section 17(5) of Application No. GB1404445.7, dated Sep. 26, 2014, 3 pages.

Extended European Search Report of Application No. EP14275057, dated Jun. 27, 2014, 7 pages.

* cited by examiner

HEAT EXCHANGER

RELATED APPLICATIONS

This application is a national phase application filed under 35 USC §371 of PCT Application No. PCT/GB2015/050705 with an International filing date of Mar. 11, 2015 which claims priority of GB Patent Application 1404445.7 filed Mar. 13, 2014 and EP Patent Application 14275057.9 filed Mar. 13, 2014. Each of these applications is herein incorporated by reference in their entirety for all purposes.

FIELD OF THE INVENTION

This invention relates in general to heat exchangers, and relates in particular to heat exchangers employed on aircraft.

BACKGROUND

It is known to use heat exchangers onboard aircraft that utilise ambient atmospheric air as a cooling medium with which to cool on-board aircraft systems coolant. For example, air scoops may be located in ambient air, which direct air through dedicated inlets into the aircraft to provide coolant air into heat exchangers. Waste air may be disposed of through exhaust outlets. Also for example, heat exchangers may be located within by-pass ducts of an aircraft engine, the by-pass duct providing cooling air to the heat exchanger and also disposing of it.

In a separate field of technology, it is known to dispose anti-swirl vanes at an airflow inlet to an aircraft engine so as to improve the flow quality of air into the aircraft engine. An anti-swirl device is typically located in front of the engine face. Such devices at least partially remove airflow cross flows and/or secondary flows at the engine face.

SUMMARY OF THE INVENTION

The present invention provides a heat exchanger that, in addition to a heat-transfer capability, provides an anti-swirl capability.

The present inventors have realised that a heat exchanger located at the engine face may provide an additional anti-swirl functionality.

In a first aspect, the present invention provides a heat exchanger comprising a duct through which a first fluid may flow and one or more anti-swirl vanes disposed within the duct and configured to disrupt the flow of the first fluid through the duct. Each vane comprises: one or more first flow channels, the first flow channels being in fluid communication with the duct such that the first fluid flowing through the duct may flow through the first flow channels; and one or more second flow channels through which a second fluid may flow so as to transfer heat between the first fluid and the second fluid; the second flow channels within the vanes are separated from the duct and the first flow channels by at least one channel wall such that fluid cannot flow between the duct and a second flow channel or between a first flow channel and a second flow channel.

At least one channel wall of each second flow channel may form a channel wall of at least one first flow channel.

The heat exchanger may further comprise means configured to divert at least some of the first fluid flowing through the duct into a first flow channel of at least one vane.

The duct may comprises a duct wall. The duct wall may comprise a first cavity in fluid communication with the first flow channels of each vane. The duct wall may comprise: a second cavity; an inlet through which the second fluid may enter the second cavity; and an outlet through which the second fluid may exit the second cavity. The second cavity may be in fluid communication with the second flow channels of each vane.

The second cavity may be partitioned into two separate chambers. The inlet may be an inlet to a first of the two chambers. The outlet may be an outlet from a second of the two chambers. The two separate chambers may be connected via only the second flow channels of the vanes such that the second fluid flowing from the inlet to the outlet passes through at least one second flow channel of at least one vane.

The heat exchanger may further comprise a tube located within and coaxially with the duct, the tube having a smaller diameter than the duct. The vanes may be attached between an inner surface of the duct and an outer surface of the tube.

The inlets to the first flow channels of the vanes may be located on an inner surface of the tube.

In a further aspect, the present invention provides an aircraft comprising a heat exchanger, the heat exchanger being in accordance with the above aspect. The first fluid may be air. The heat exchanger may be arranged on the aircraft such that forward motion of the aircraft causes air to be forced through the duct. The heat exchanger may be located at a main intake duct of an engine of the aircraft, such that prior to entering the engine, air passes through the heat exchanger. The second fluid may be aircraft systems coolant. The aircraft may comprise means to move aircraft systems coolant, from an aircraft system remote from the heat exchanger, through the one or more second flow channels. The aircraft may comprise means to return aircraft systems coolant that has been passed through the one or more second flow channels to the aircraft system.

In a further aspect, the present invention provides a method of transferring heat between a first fluid and a second fluid. The method comprises: providing a duct; disposing one or more anti-swirl vanes within the duct, the vanes being configured to disrupt a fluid flow through the duct, each vane comprising: one or more first flow channels, the first flow channels being in fluid communication with the duct such that the first fluid flowing through the duct may flow through the first flow channels; and one or more second flow channels, the second flow channels within the vanes being separated from the duct and the first flow channels by at least one channel wall such that fluid cannot flow between the duct and the second flow channels or between a first flow channel and a second flow channel; causing the first fluid to flow through the duct and through the one or more first flow channels; and, simultaneously with the first fluid flowing through the duct and the one or more first flow channels, causing the second fluid to flow through the one or more second flow channels, thereby causing heat to be transferred between the first fluid and the second fluid.

At least one channel wall of each flow channel may form a channel wall of at least one first flow channel.

In a further aspect, the present invention provides an anti-swirl vane for disrupting fluid flow in a duct in which the vane is placed, the vane comprising: one or more first flow channels through which a first fluid may flow, and one or more second flow channels through which a second fluid may flow. The second flow channels are different to the first flow channels. At least one channel wall of each second flow channel forms a channel wall of at least one first flow channel.

In a further aspect, the present invention provides a heat exchanger comprising a duct through which a first fluid (e.g.

a coolant such as ram air) may flow, and one or more anti-swirl vanes disposed within the duct and configured to disrupt the flow of the first fluid through the duct. Each vane comprises one or more flow channels through which a second fluid (e.g. a fluid to be cooled, such as engine coolant) may flow so as to transfer heat between the first fluid flowing through the duct and the second fluid flowing through the one or more flow channels. The flow channels within the vanes are separated from the duct by a channel wall such that fluid cannot flow between the duct and the flow channels.

Each vane may further comprise one or more further flow channels. The further flow channels may be different (i.e. separate from) to the flow channels. The further flow channels may be in fluid communication with the duct such that the first fluid flowing through the duct may flow through the further flow channels. At least one channel wall of each flow channel may form a channel wall of at least one further flow channel.

The heat exchanger may further comprise means configured to divert at least some of the first fluid flowing through the duct into a further flow channel of at least one vane.

The duct may comprise a duct wall comprising a first cavity that is in fluid communication with the further flow channels of each vane.

The duct may comprise a duct wall comprising a second cavity, an inlet through which the second fluid may enter the second cavity, and an outlet through which the second fluid may exit the second cavity. The second cavity may be in fluid communication with the flow channels of each vane.

The second cavity may be partitioned into two separate chambers. The inlet may be an inlet to a first of the two chambers. The outlet may be an outlet from a second of the two chambers. The two separate chambers may be connected via the flow channels of the vanes such that the second fluid flowing from the inlet to the outlet passes through at least one flow channel of at least one vane.

The heat exchanger may further comprise a tube located within and coaxially with the duct, the tube having a smaller diameter than the duct. The vanes may be attached between an inner surface of the duct and an outer surface of the tube.

Inlets to the further flow channels of the vanes may be located on an inner surface of the tube.

In a further aspect, the present invention provides an aircraft comprising a heat exchanger, the heat exchanger being in accordance with the above aspect.

The first fluid may be air. The heat exchanger may be arranged on the aircraft such that forward motion of the aircraft causes air to be forced through the duct.

The heat exchanger may be located at a main intake duct of an engine of the aircraft engine (i.e. in front of the engine face), such that prior to entering the aircraft engine, air passes through the heat exchanger (i.e. through the duct and/or the further flow channels).

The second fluid may be aircraft systems coolant. The aircraft may comprise means (e.g. a pump) to move aircraft systems coolant, from a system of the aircraft that is remote from the heat exchanger, through the one or more flow channels, and means (e.g. a pump) to return aircraft systems coolant that has been passed through the one or more flow channels to that remote system.

In a further aspect, the present invention provides a method of transferring heat between a first fluid (e.g. a coolant such as ram air) and a second fluid (e.g. a fluid to be cooled such as engine coolant), the method comprising: providing a duct; disposing one or more anti-swirl vanes within the duct, the vanes being configured to disrupt a fluid flow through the duct, each vane comprising one or more flow channels, each flow channel being separated from the duct by a channel wall such that fluid cannot flow between the duct and that flow channel; causing the first fluid to flow through the duct; and, simultaneously with the first fluid flowing through the duct, causing the second fluid to flow through the flow channels, thereby causing heat to be transferred between the first fluid flowing through the duct and the second fluid flowing through the one or more flow channels.

Each vane may further comprise one or more further flow channels. The further flow channels may be different to the flow channels. The further flow channels may be in fluid communication with the duct. At least one channel wall of each flow channel may form a channel wall of at least one further flow channel. The step of causing the first fluid to flow through the duct may include causing at least some of the first fluid to flow through the one or more further flow channels.

In a further aspect, the present invention provides an anti-swirl vane for disrupting fluid flow in a duct in which the vane is placed, the vane comprising: one or more first flow channels through which a first fluid may flow; one or more second flow channels through which a second fluid may flow; wherein the second flow channels are different to the first flow channels; and at least one channel wall of each second flow channel forms a channel wall of at least one first flow channel.

DETAILED DESCRIPTION

Figure 1:
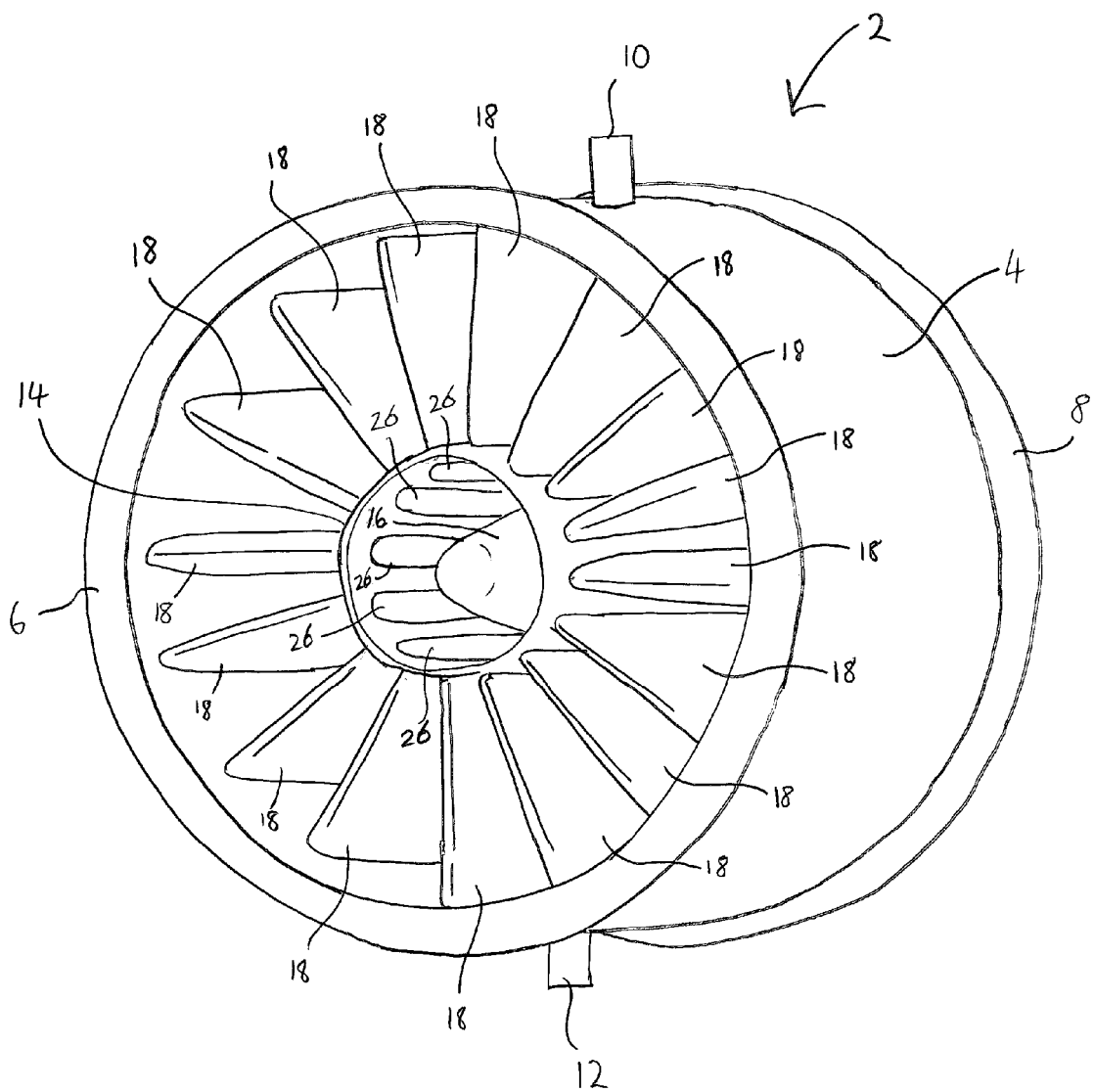
FIG. 1 is a schematic illustration (not to scale) of an embodiment of a heat exchanger.

In the following description, like reference numerals refer to like elements.

The following description is based on embodiments of the invention and should not be taken as limiting the invention with regard to alternative embodiments that are not explicitly described herein.

It will be appreciated that relative terms such as top and bottom, upper and lower, and so on, are used merely for ease of reference to the Figures, and these terms are not limiting as such, and any two differing directions or positions and so on may be implemented.

FIG. 1 is a schematic illustration (not to scale) of an embodiment of a heat exchanger 2.

In this embodiment, the heat exchanger 2 is made of aluminium. However, in other embodiments, the heat exchanger 2 is made of one or more different materials instead of or in addition to aluminium, for example, a different metal.

In this embodiment, the heat exchanger 2 comprises an outer cylindrical portion 4 having opposite open ends. A first circular flange 6 is located at a first end of the outer cylindrical portion 4, and a second circular flange 8 is located at a second end of the outer cylindrical portion 4 opposite to the first end.

In this embodiment, as described in more detail later below, the outer cylindrical portion 4 comprises two separate cavities. A first of these cavities is hereinafter referred to as the "coolant cavity" and a second of these cavities is hereinafter referred to as the "air cavity". In use, as described in more detail later below with reference to FIG. 3, aircraft systems coolant (e.g. engine coolant) flows through the coolant cavity of the outer cylindrical portion 4. Also, as described in more detail later below with reference to FIG. 3, in use, air flows through the air cavity of the outer cylindrical portion 4. Preferably, the coolant cavity and the air cavity share a common wall which is made of a thermally conductive material.

In this embodiment, as described in more detail later below, the coolant cavity of the outer cylindrical portion 4 is partitioned into two separate chambers, for example, by walls located within the coolant cavity of the outer cylindrical portion 4. The two separate chambers that form the coolant cavity are hereinafter referred to as the "upper coolant cavity" and the "lower coolant cavity". The upper coolant cavity is located in the uppermost portion of the outer cylindrical portion 4. The lower coolant cavity is located in the lowermost portion of the outer cylindrical portion 4.

The outer cylindrical portion 4 comprises an inlet 10 through which aircraft systems coolant may be fed into the upper coolant cavity of the outer cylindrical portion 4. Also, the outer cylindrical portion 4 comprises an outlet 12 through which aircraft systems coolant may flow out of the lower coolant cavity of the outer cylindrical portion 4.

In this embodiment, the length of the outer cylindrical portion 4 is 0.827 m, and the external diameter of the outer cylindrical portion 4 is 1.022 m. However, in other embodiments, the outer cylindrical portion 4 has different appropriate dimensions.

The outer cylindrical portion 4 provides a duct (i.e. a tube) through which a fluid (e.g. air) may flow.

The heat exchanger 2 further comprises an inner cylindrical portion 14 located within and coaxially with the outer cylindrical portion 4, the inner cylindrical portion 14 being of smaller diameter than the outer cylindrical portion 4.

In this embodiment, the length of the inner cylindrical portion 14 is 0.827 m, and the external diameter of the inner cylindrical portion 14 is 0.301 m. However, in other embodiments, the inner cylindrical portion 14 has different appropriate dimensions.

In this embodiment, as described in more detail later below, the inner cylindrical portion 14 comprises two skins, an inner skin and an outer skin, which are spaced apart so as to define therebetween a cavity through which a fluid, in particular aircraft systems coolant, may flow.

The inner cylindrical portion 14 houses a generally cone-shaped member 16 located within and coaxially with the inner cylindrical portion 14.

The inner cylindrical portion 14 is attached to the outer cylindrical portion 4 by a plurality of vanes 18 that extend radially outwards from the inner cylindrical portion 14 from an outer surface of the inner cylindrical portion 14 to an inner surface of the outer cylindrical portion 4. In this embodiment, there are sixteen vanes 18, however in other embodiments there are a different number of vanes 18.

The leading or "upstream" edges of the vanes 18 are located proximate to the first end of the outer cylindrical portion 4, i.e. proximate to the first flange 6. The trailing or "downstream" edges of the vanes 18 are located proximate to the second end of the outer cylindrical portion 4, i.e. proximate to the second flange 8.

Figure 2:
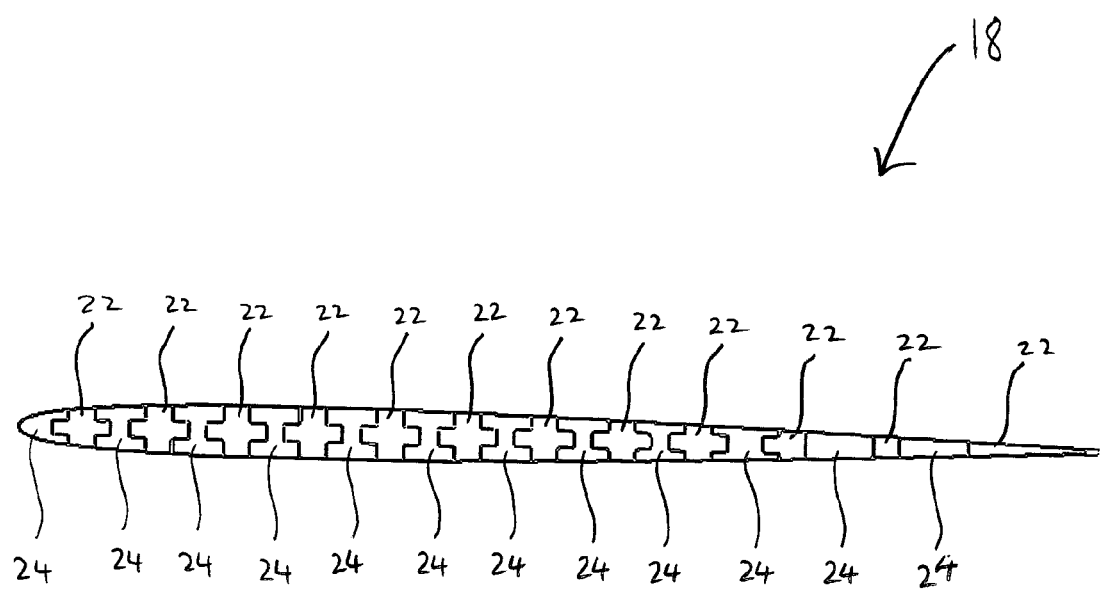
FIG. 2 is a schematic illustration (not to scale) of a cross section through a vane of the heat exchanger.

FIG. 2 is a schematic illustration (not to scale) of a cross section through a vane 18.

In this embodiment, each vane 18 is a blade that has a substantially elongate tear-drop shaped cross section. In other embodiments, one or more of the vanes may have a different shape to the vanes of this embodiment, i.e. a vane may be shaped such that the cross-section of the vane is not tear-drop shaped. The vanes may be shaped to suit the airflow regime.

In this embodiment, each vane 18 comprises two sets of channels through which fluid may flow. A first set of channels (each of which is hereinafter referred to as a "first vane channel" and is indicated in FIG. 2 by the reference numeral 22) comprises channels through which, in use, air flows. A second set of channels (each of which is hereinafter referred to as a "second vane channel" and is indicated in FIG. 2 by the reference numeral 24) comprises channels through which, in use, aircraft systems coolant flows.

In this embodiment, each of the first vane channels 22 shares a common wall with at least one of the second vane channels 24. The channel walls are made of a thermally conductive material such as aluminium. Also, the channel walls may be shaped so as to provide a large surface area, for example, the channel walls may include crenellation features or have wavy cross sections. Such features advantageously tend to facilitate heat transfer between a fluid flowing through the first vane channels 22 and a fluid flowing through the second vane channels 24.

Inlets through which air may flow into the first vane channels 22, which are hereinafter referred to as the "vane air inlets" and are indicated in the Figures by the reference numerals 26, are located on an inner surface of the inner cylindrical portion 14. Outlets through which air may flow out of the first vane channels 22, which are hereinafter referred to as the "vane air outlets", are located at the trailing edges of the vanes 18.

In this embodiment, the first vane channels 22 are in fluid communication with the air cavity of the outer cylindrical portion 4 such that air flowing through the first vane channels may enter the air cavity of the outer cylindrical portion 4.

In this embodiment, the second vane channels 24 of the vanes 18 in the upper half of the heat exchanger 2 are in fluid communication with the upper coolant cavity of the outer cylindrical portion 4, and also the cavity of the inner cylindrical portion 14. This is such that, as described in more detail later below with reference to FIG. 3, aircraft systems coolant may flow between the upper coolant cavity and the cavity of the inner cylindrical portion 14 via those second vane channels 24.

In this embodiment, the second vane channels 24 of the vanes 18 in the lower half of the heat exchanger 2 are in fluid communication with the lower coolant cavity of the outer cylindrical portion 4, and also the cavity of the inner cylindrical portion 14. This is such that, as described in more detail later below with reference to FIG. 3, aircraft systems coolant may flow between the cavity of the inner cylindrical portion 14 and the lower coolant cavity via those second vane channels 24.

Figure 3:
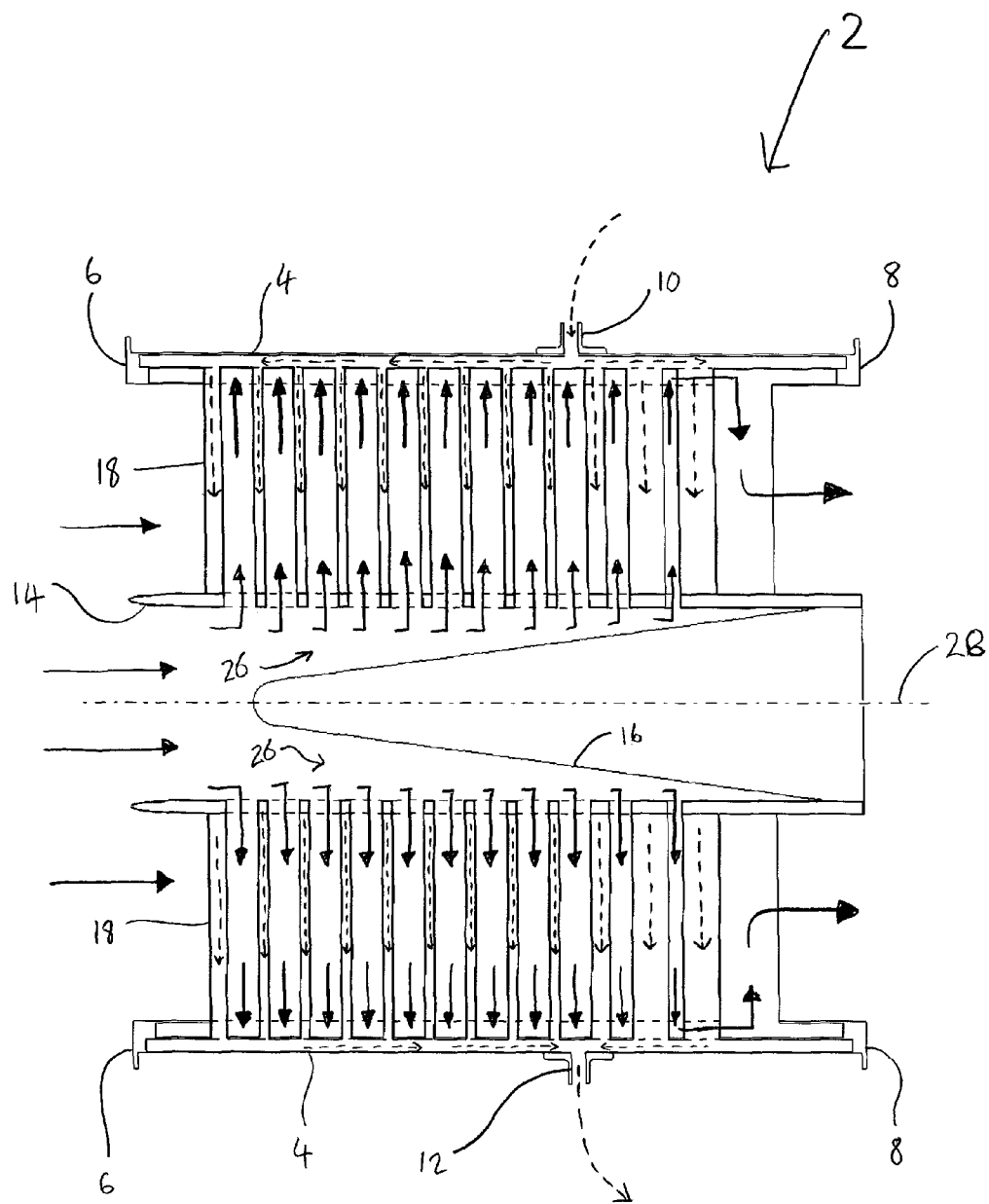
FIG. 3 is a schematic illustration (not to scale) showing a cross section of the heat exchanger in use.

FIG. 3 is a schematic illustration (not to scale) showing a cross section of the heat exchanger 2 in use.

In use, the heat exchanger 2 is attached to the main intake duct of an aircraft engine such that ram air travels through the heat exchanger 2 prior to entering the engine. The first and second flanges 6, 8 facilitate the attachment of the heat exchanger 2 to the aircraft. Preferably, the heat exchanger 2 is mounted to the aircraft engine such that the longitudinal axis 28 of the heat exchanger 2 is substantially parallel with the longitudinal axis of the aircraft.

In use, the operation of the engine and also the forward motion of the aircraft causes ram air to enter the heat exchanger 2 at the first end of the heat exchanger 2 prior to that air entering the aircraft engine.

The flow of air through the heat exchanger 2 is indicated in FIG. 3 by solid arrows.

The heat exchanger 2 defines two flow paths for air travelling through the heat exchanger 2.

A first flow path for air travelling through the heat exchanger 2 is between the outer cylindrical portion 4 and the inner cylindrical portion 14. In particular, some of the air entering the heat exchanger 2 at the first end flows over the external surfaces of the vanes 18 and exits the heat exchanger 2 at the second end, whereby the air then enters the aircraft engine. Along this first flow path, the air travels through the spaces between the vanes 18. Thus, the vanes 18 divide the first flow path into a plurality of sub-paths along which air flows. The vanes 18 advantageously disrupt this flow of air through the heat exchanger 2 and tend to limit pre-rotation of the air entering into the aircraft engine. Thus, the heat exchanger is an "anti-swirl" device that tends to reduce or eliminate the swirl, i.e. rotation, of intake airflow to the engine.

A second flow path for air travelling through the heat exchanger 2 is as follows. Some of the air entering the heat exchanger 2 at the first end flows into the inner cylindrical portion 14 and is diverted, by the generally cone-shaped member 16, into the vane air inlets 26 located in the inner surface of the inner cylindrical portion 14. The air then flows along the first vane channels 22 of the vanes 18 and into the air cavity of the outer cylindrical portion 4. In this embodiment, the first vane channels 22 are substantially perpendicular to the longitudinal axis 28 of the heat exchanger 2. The air then flows from the air cavity of the outer cylindrical portion 4, out of the heat exchanger 2 at the second end via the vane air outlets located at the trailing edges of the vanes 18, whereby the air then enters the aircraft engine.

While air is flowing through the heat exchanger 2 as described in more detail above, relatively high temperate aircraft systems coolant (which has been pumped from the a remote aircraft system, e.g. an aircraft engine, to the heat exchanger 2) also passes through the heat exchanger 2 as follows.

The flow of aircraft systems coolant through the heat exchanger 2 is indicated in FIG. 3 by dotted arrows.

Firstly, the aircraft systems coolant is fed into the upper coolant cavity of the outer cylindrical portion 4 via the coolant inlet 10. The aircraft systems coolant flowing through the upper coolant cavity of the outer cylindrical portion 4 is cooled, at least to some extent, by air flowing through the air cavity of the outer cylindrical portion 4.

After flowing through the upper coolant cavity of the outer cylindrical portion 4, the aircraft systems coolant then flows into and through the second vane channels 24 of the vanes 18 located in the upper half of the heat exchanger 2. The aircraft systems coolant flowing through the second vane channels 24 of the vanes 18 located in the upper half of the heat exchanger 2 is cooled, at least to some extent, by air flowing through the first vane channels 22 of those vanes 18.

After flowing through the second vane channels 24 of the vanes 18 located in the upper portion of the heat exchanger 2, the aircraft systems coolant then flows into and through the cavity of the inner cylindrical portion 14. The aircraft systems coolant flowing through the cavity of the inner cylindrical portion 14 is cooled, at least to some extent, by air flowing through the inner cylindrical portion 14.

After flowing through the cavity of the inner cylindrical portion 14, the aircraft systems coolant then flows into and through the second vane channels 24 of the vanes 18 located in the lower half of the heat exchanger 2. The aircraft systems coolant flowing through the second vane channels 24 of the vanes 18 located in the lower half of the heat exchanger 2 is cooled, at least to some extent, by air flowing through the first vane channels 22 of those vanes 18.

After flowing through the second vane channels 24 of the vanes 18 located in the lower portion of the heat exchanger 2, the aircraft systems coolant then flows into and through the lower coolant cavity of the outer cylindrical portion 4. The aircraft systems coolant flowing through the lower coolant cavity of the outer cylindrical portion 4 is cooled, at least to some extent, by air flowing through the air cavity of the outer cylindrical portion 4.

After flowing through the lower coolant cavity of the outer cylindrical portion 4, the aircraft systems coolant flows out of the heat exchanger 2 via the coolant outlet 12. The aircraft systems coolant exiting the heat exchanger 2 via the coolant outlet 12 has a lower temperature than the aircraft systems coolant flowing into the heat exchanger 2 due to that aircraft systems coolant having been cooled as it flows through the heat exchanger 2 by the air flow through the heat exchanger 2. The aircraft systems coolant exiting the heat exchanger 2 via the coolant outlet 12 may be returned to the remote aircraft system to cool that system.

In this embodiment, the second vane channels 24 are substantially perpendicular to the longitudinal axis 28 of the heat exchanger 2.

Thus an embodiment of a heat exchanger is provided.

The above described heat exchanger advantageously reduces or eliminates rotation within an air flow entering the aircraft engine whilst, at the same time, using that air flow to cool the aircraft systems coolant of the aircraft. The anti-swirl capability of the heat exchanger advantageously tends to increase engine performance and reduce through life engine costs.

The above described heat exchanger advantageously exploits the main engine air inflow to provide cooling for engine coolant.

The vanes and the channels located therein advantageously provide a large surface area to increase heat transfer between the aircraft systems coolant and the air travelling around and through the vanes.

The above described heat exchanger is advantageously positioned onboard the aircraft such that engine airflow is used as a heat exchanger coolant, as opposed to creating a cooling airflow by other means (e.g. by using an air scoop).

Advantageously, the cooling air exiting the heat exchanger along the trailing edges of the vanes tends to exploit 'reverse jet pump' suction.

In the above embodiments, the heat exchanger is used onboard an aircraft to cool aircraft systems coolant using an air inflow of the aircraft engine. However, in other embodiments, the heat exchanger may be used in a different manner, for example, onboard a different type of vehicle such as a ship. In other embodiments, the heat exchanger may be used to cool a different type of fluid other than aircraft systems coolant. In some embodiments, the heat exchanger may be used to condense vapour coolant. In some embodiments, the heat exchanger may include multiple separated paths so that more than one fluid may be cooled by the air flow simultaneously. Also, in other embodiments, the heat exchanger may use the flow of a different fluid, i.e. other than air (e.g. water), to provide cooling.

In some embodiments, one or more fans, high pressure ejectors, and/or other suitable devices may be incorporated to balance any pressure differential between air travelling along different air routes through the heat exchanger.

What is claimed is:

1. A heat exchanger (2) comprising:
    an outer cylindrical portion (4) comprising a duct through which a first fluid may flow; and
    one or more anti-swirl vanes (18) disposed within the duct and configured to disrupt the flow of the first fluid through the duct; wherein
    each vane (18) comprises:
        one or more first flow channels (22), the one or more first flow channels (22) being in fluid communication with the duct such that the first fluid flowing through the duct may flow through the one or more first flow channels (22); and
        one or more second flow channels (24) through which a second fluid may flow so as to transfer heat between the first fluid and the second fluid;
    the one or more second flow channels (24) are separated from the duct and the one or more first flow channels (22) by at least one channel wall, respectively, such that fluid cannot flow between the duct and the one or more second flow channels or between the one or more first flow channels and the one or more second flow channels (24).

2. The heat exchanger (2) according to claim 1, wherein the at least one channel wall forms a channel wall of each second flow channel (24) and each first flow channel (22).

3. The heat exchanger (2) according to claim 1, the heat exchanger (2) further comprising means (16) configured to divert at least some of the first fluid flowing through the duct into each first flow channel (22) of each vane (18).

4. The heat exchanger (2) according to claim 1, wherein the duct comprises a duct wall positioned in the duct;
    the duct wall comprises a first cavity in fluid communication with each first flow channel (22) of each vane (18).

5. The heat exchanger (2) according to claim 1, wherein the outer cylindrical portion (4) comprises a wall;
    the wall comprises:
        a second cavity;
        an inlet (10) through which the second fluid may enter the second cavity; and
        an outlet (12) through which the second fluid may exit the second cavity; and
    the second cavity is in fluid communication with each second flow channel (24) of each vane (18).

6. The heat exchanger (2) according to claim 5, wherein the second cavity is partitioned into two separate chambers;
    the inlet (10) is an inlet to a first of the two chambers;
    the outlet (12) is an outlet from a second of the two chambers; and
    the two separate chambers are connected via each second flow channel (24) of each vane (18) such that the second fluid flowing from the inlet (10) to the outlet (12) passes through each second flow channel (24) of each vane (18).

7. The heat exchanger (2) according to claim 1, wherein the heat exchanger (2) further comprises a tube (14) located within and coaxially with the duct, the tube (14) having a smaller diameter than the duct; and
    the one or more vanes (18) are attached between an inner surface of the outer cylindrical portion (4) and an outer surface of the tube (14).

8. The heat exchanger (2) according to claim 7, wherein an inlet (26) of each first flow channel (22) of each vane (18) is located on an inner surface of the tube (14).

9. An aircraft comprising a heat exchanger (2), the heat exchanger (2) being in accordance with claim 1.

10. The aircraft according to claim 9, wherein
    the first fluid is air; and
    the heat exchanger (2) is arranged on the aircraft such that forward motion of the aircraft causes air to be forced through the duct.

11. The aircraft according to claim 10, wherein the heat exchanger (2) is located at a main intake duct of an engine of the aircraft, such that prior to entering the engine, air passes through the heat exchanger (2).

12. The aircraft according to claim 9, wherein
    the second fluid is aircraft systems coolant; and
    the aircraft comprises:
        means to move aircraft systems coolant, from an aircraft system remote from the heat exchanger (2), through the one or more second flow channels (24); and
        means to return aircraft systems coolant that has been passed through the one or more second flow channels (24) to the aircraft system.

13. A method of transferring heat between a first fluid and a second fluid, the method comprising:
    providing an outer cylindrical portion (4) comprising a duct;
    disposing one or more anti-swirl vanes (18) within the duct, the one or more anti-swirl vanes (18) being configured to disrupt a fluid flow through the duct, each vane (18) comprising:
        one or more first flow channels (22), the one or more first flow channels (22) being in fluid communication with the duct such that the first fluid flowing through the duct may flow through the one or more first flow channels (22); and
        one or more second flow channels (24), the one or more second flow channels (24) being separated from the duct and the one or more first flow channels (22) by at least one channel wall, respectively, such that fluid cannot flow between the duct and the one or more second flow channels (24) or between the one or more first flow channels (22) and the one or more second flow channels (24);
    causing the first fluid to flow through the duct and through the one or more first flow channels (22); and,
    simultaneously with the first fluid flowing through the duct and the one or more first flow channels (22), causing the second fluid to flow through the one or more second flow channels (24), thereby causing heat to be transferred between the first fluid and the second fluid.

14. The method according to claim 13, wherein at least one channel wall forms a channel wall of each second flow channel (24) and each first flow channel (22).

15. An anti-swirl vane (18) for disrupting fluid flow in a duct in which the vane (18) is placed, the vane (18) comprising:
    one or more first flow channels (22) through which a first fluid flows;
    one or more second flow channels (24) through which a second fluid flows; wherein
    each second flow channel (24) is different from the one or more first flow channels (22); and at least one channel wall of each second flow channel (24) forms a channel wall of at least one of the one or more first flow channels (22);

wherein the one or more second flow channels (24) are separated from the duct and the one or more first flow channels (22) by the at least one channel wall, respectively, such that fluid cannot flow between the duct and the one or more second flow channels or between the one or more first flow channels (22) and the one or more second flow channels (24).

\* \* \* \* \*